No. 753,267.

Patented March 1, 1904.

UNITED STATES PATENT OFFICE.

JOHN FRANK HUEFNER, OF NEW YORK, N. Y.

PROCESS OF MAKING A SALVE.

SPECIFICATION forming part of Letters Patent No. 753,267, dated March 1, 1904.

Application filed December 11, 1903. Serial No. 184,819. (No specimens.)

*To all whom it may concern:*

Be it known that I, JOHN FRANK HUEFNER, a citizen of the United States, residing at New York city, Manhattan, county and State of New York, have invented an Improved Process of Making Salves, of which the following is a specification.

This invention relates to a new process of making a salve which is adapted to draw the heat out of frost-bites and frozen limbs, so as to effect a quick healing.

The salve is composed of the following ingredients: seventy parts, by weight, olive-oil; fifteen parts, by weight, cocoa-butter, and fifteen parts, by weight, beef-marrow.

In carrying out my process the marrow is liquefied and mixed with the cocoa-butter and the olive-oil. The mixture is now rapidly frozen by being subjected to a temperature of about 12° Fahrenheit. By this rapid freezing operation the whole mixture will be solidified into a body containing a large number of very fine crystals. Thus there is formed a salve uniform to the naked eye, the fine crystals of which are adapted to absorb a large quantity of liquid fat. The salve is inclosed into boxes which are non-conductive of heat and should be kept in a cool place, so that it will retain its solidified condition. In this condition it is applied to the frost-bites and will effectively cool and heal the same. The cocoa-butter and marrow constitute jointly a fatty carrier for the oil.

What I claim is—

The process of making a salve which consists in mixing olive-oil with cocoa-butter and liquefied beef-marrow, and quickly freezing the mixture at a temperature of about 12° Fahrenheit to form a body containing a large number of fine crystals, substantially as specified.

Signed by me at New York city, Manhattan, New York, this 10th day of December, 1903.

JOHN FRANK HUEFNER.

Witnesses:
 WILLIAM SCHULZ,
 FRANK V. BRIESEN.